United States Patent [19]

Piekos

[11] Patent Number: 5,759,658
[45] Date of Patent: Jun. 2, 1998

[54] COMPOSITE PANELS, ARTICLES INCORPORATING SAME AND METHOD

[75] Inventor: Richard M. Piekos, Morton Grove, Ill.

[73] Assignee: Tables International Corporation, Morton Grove, Ill.

[21] Appl. No.: 639,200

[22] Filed: Apr. 26, 1996

[51] Int. Cl.$^6$ .................... B44C 1/26; B32B 5/16
[52] U.S. Cl. .................... 428/67; 428/46; 428/111; 428/114; 442/44; 442/45; 442/70; 442/74; 442/75; 442/175; 442/180; 442/284; 442/294
[58] Field of Search .................... 428/67, 46, 111, 428/114; 442/45, 44, 70, 74, 75, 175, 180, 284, 294

[56] References Cited

U.S. PATENT DOCUMENTS

| | | | |
|---|---|---|---|
| 3,062,604 | 11/1962 | Hodgen | 428/67 |
| 3,097,080 | 7/1963 | Weir | 428/46 |
| 3,313,674 | 4/1967 | Mathews . | |
| 3,661,662 | 5/1972 | Allen | 428/67 |
| 3,707,434 | 12/1972 | Stayner . | |
| 4,312,912 | 1/1982 | Tamura . | |
| 4,337,290 | 6/1982 | Kelly et al. | 442/180 |
| 4,550,044 | 10/1985 | Rosenberg et al. . | |
| 4,618,525 | 10/1986 | Chamberlain et al. . | |
| 4,678,702 | 7/1987 | Lancaster et al. . | |
| 4,705,161 | 11/1987 | Gozdiff . | |
| 4,886,699 | 12/1989 | Carroll et al. . | |
| 5,002,827 | 3/1991 | Shimada et al. . | |
| 5,100,713 | 3/1992 | Homma et al. . | |
| 5,154,954 | 10/1992 | Croop et al. . | |
| 5,154,959 | 10/1992 | Dei Rossi | 428/67 |
| 5,209,968 | 5/1993 | Sweeney . | |
| 5,217,800 | 6/1993 | Pentecost . | |
| 5,268,226 | 12/1993 | Sweeney . | |
| 5,415,917 | 5/1995 | Tesch | 428/102 |
| 5,425,985 | 6/1995 | Irvin . | |
| 5,480,714 | 1/1996 | Ito et al. . | |
| 5,545,446 | 8/1996 | Looi et al. | 428/46 |

FOREIGN PATENT DOCUMENTS 1006294  9/1965  United Kingdom .................... 428/46

*Primary Examiner*—Terrel Morris
*Attorney, Agent, or Firm*—Lockwood, Alex, Fitzgibbon & Cummings

[57] ABSTRACT

A composite panel is provided which includes a resin matrix having embedded therewithin alternating layers of particulates and flexible sheeting. The composite panel is capable of supporting its own weight and exhibits impact resistance and shatter resistance. Preferably, the resin is transparent, the particulates are decorative, and the flexible sheeting becomes transparent upon curing of the resin. The composite panels are included within articles such as tables, desks, other furniture, vertical partitions, decorative panels, doors, windows and floors. Also included is a method of making the composite panels by molding layers of these materials within an open mold.

20 Claims, 2 Drawing Sheets

COMPOSITE PANELS, ARTICLES INCORPORATING SAME AND METHOD

BACKGROUND AND DESCRIPTION OF THE INVENTION

This invention generally relates to composite panels, articles incorporating them, and a method for making the composite panels. More particularly, the invention relates to panels which are composites of a resin matrix, a plurality of particulates embedded within the resin matrix and a plurality of flexible sheets also embedded within the resin matrix, the sheets including at least two sheets that are generally parallel to each other while being spaced apart from each other within the matrix. The composite panel is capable of supporting its own weight, and typically a number of the particulates are visible while within the composite panel. The articles incorporating the composite panel can take the form of furniture such as table tops and desk tops, and they can be used as floors, doors, windows, vertical partitions and decorative panels. The composite panels are rigid and provide decorative interest, especially due to the visibility of the particulates.

In the past, molded panels have been provided which are suitable for use as furniture tops, wall panels, partitions and the like. These panels can be polymeric and cured within a mold imparting the desired perimeter shape or profile to the table top, panel or the like. These types of products provide attractive and generally durable surfaces or panels which can be made into a variety of shapes and colors as desired. One element which they generally lack is having a transparent or translucent look or appearance. Often, glass or glass substitutes such as polycarbonates and the like are required for furniture tops, panels, doors, windows and the like which are to be transparent or to have transparent components.

Furthermore, products such as glass panels and tops are limited when it comes to adding decorative materials within the glass itself or the like. At times, it can be problematic to provide such types of furniture tops, panels and the like which are rigid enough to support their own weight, even when included in an article that provides it with minimal support, such as uses which present the panel as a decorative element in itself that is provided with only minimal structural support. In many cases, such panels are not supported throughout their surface, but can have wide expanses of surface area that is neither covered nor supported by other components of the article, such as framing, backing panels and the like.

In accordance with the present invention, it has been determined that composite panels can be provided which support their own weight and which offer unique design variety in transparent and translucent formats while still providing surfaces such as furniture tops, vertical panels, doors, windows, flooring and the like. The composite panels provided in this regard are made in a generally laminated manner, the composite laminate including a resin matrix, a plurality of particulates embedded within the resin matrix and a plurality of flexible sheets fully embedded within the resin matrix in a generally sandwich-like fashion. The resulting composite panel is capable of supporting its own weight, while being shatter resistant. In the preferred embodiment, the resin matrix is composed of a cured resin which is generally transparent or translucent, and the plurality of particulates are visible because they can be viewed through the cured resin matrix. When desired, the flexible sheets will likewise be imparted with transparent properties when within the resin matrix and will not be easily discernible. The particulates are of a type which enhance the overall appearance of the composite panel and which provide a unique and attractive panel which can be both generally transparent and highly colorful, depending upon the particulates and other components which are chosen.

It is accordingly a general object of the present invention to provide improved composite panels, articles incorporating these composite panels, and a molding method for making the composite panels.

Another object of the present invention is to provide an improved composite panel which supports its own weight and while having transparent properties that allow for light passage therethrough while imparting color characteristics by means of particulates having a desired color and selected light-reflecting surfaces and shapes to afford a variety of panel appearance qualities and characteristics.

Another object of this invention is to provide an improved article of manufacture which includes and generally supports, such as by framing, pedestals, legs and the like, a composite panel, partition, top or the like which is self-supporting and variably decorative.

Another object of the present invention is to provide an improved method for making a composite panel whereby flexible sheeting and decorative and/or functional particulates are included or embedded into a cured resin.

Another object of the present invention is to provide improving flooring and panel material which will support its own weight and which will afford transparency properties to allow passage of light therethrough to achieve a back lighting effect whereby the floor or panel is itself illuminated from behind the field of view.

These and other objects, features and advantages of the present invention will be apparent from and clearly understood through a consideration of the following detailed description.

BRIEF DESCRIPTION OF THE DRAWING

In the course of this description, reference will be made to the attached drawings, wherein.

DETAILED DESCRIPTION OF THE INVENTION

Figure 1:
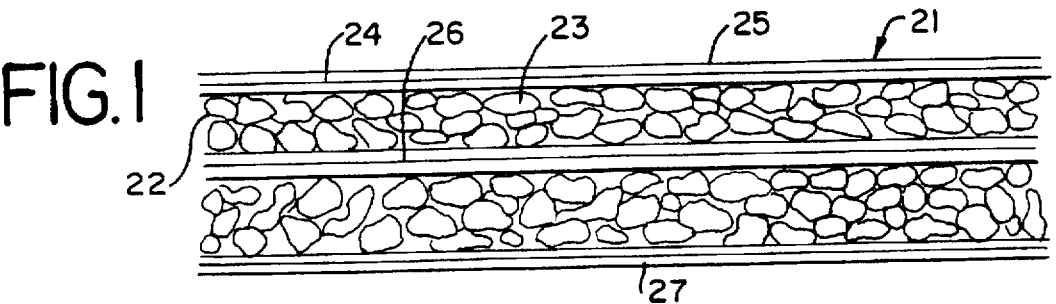
FIG. 1 through FIG. 5 are illustrations of composite panels shown in a generally cross-sectional orientation.

A composite panel in accordance with the present invention is generally designated at 21 in FIG. 1. It includes a resin matrix 22 within which other components are embedded. These other components include a plurality of particulates 23 and a plurality of flexible sheets 24. This same general combination is found in each of the embodiments illustrated herein. Except as noted elsewhere herein, the outside surface 25 of the composite is resin that is a general continuation of the resin forming the resin matrix. In many embodiments, the resin outside surface 25 and the resin matrix 22 form a single coherent block within which the particulates 23 and the flexible sheets 24 are embedded.

Each of the specific embodiments shown in FIG. 1 through FIG. 5 illustrates certain variations in the components discussed herein. The primary difference among these various embodiments is with respect to the number and placement of the flexible sheets.

In FIG. 1, the flexible sheets are placed in three different orientations, each being generally parallel to and spaced from the other. Sheet 24 is a top sheeting. Sheet 26 is an intermediate sheeting, and sheet 27 is a bottom sheeting. Resin material surrounds each of these three sheets. The resin also surrounds each of the particulates 23.

Figure 2:
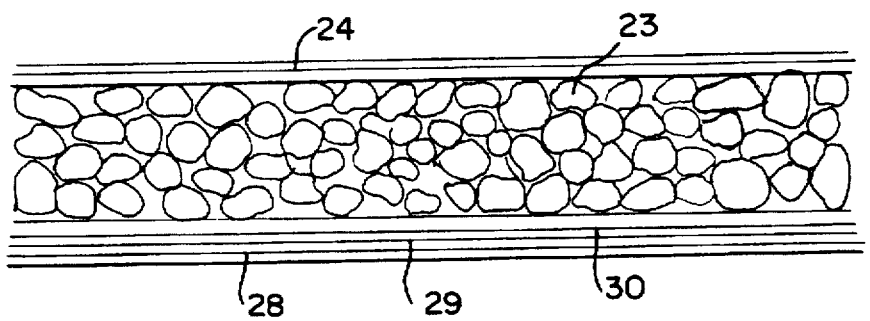
Figure 3:
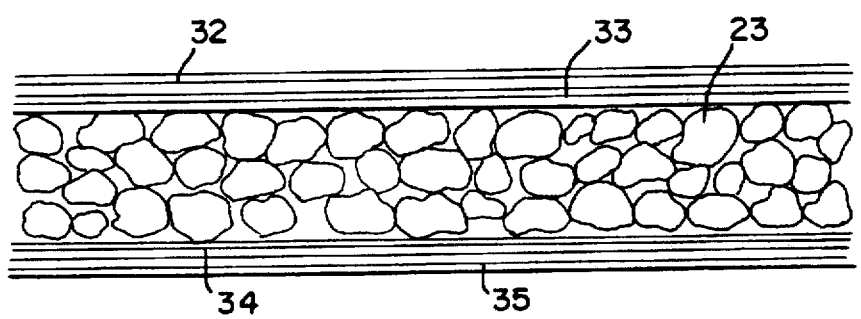

In the FIG. 2 embodiment, there is no sheeting intermediate of the particulates 23, and multiple sheets are provided within at least one of the top portion or the bottom portion of the composite. As shown in this example, the bottom portion of this composite panel includes three separate sheets 28, 29 and 30, embedded within the bottom portion of the resin. FIG. 3 is similar to FIG. 2, except it includes multiple flexible sheets, 32 and 33, embedded within its top resin and has two sheets, 34 and 35, within the bottom resin portion.

Figure 4:
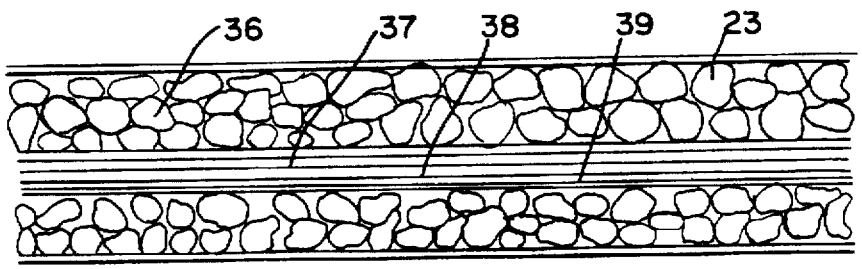
Figure 5:
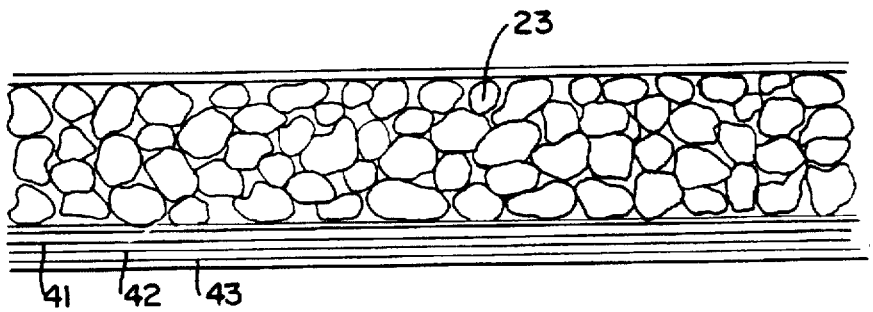

FIG. 4 illustrates the situation where multiple intermediate sheets are provided, a total of four such sheets, 36, 37, 38 and 39, being shown. A fewer number of intermediate sheets, such as three of them, could be used. In FIG. 5, multiple outside sheets are illustrated. A total of three bottom sheets 41, 42, 43 are illustrated.

It has been found that, with arrangements such as those illustrated in FIG. 1 through FIG. 5, and when fabric sheets are utilized as discussed herein, the various sheets will not be readily apparent or visible once the resin in contact with it has been cured and set into the composite panel. In a sense, the flexible sheeting disappears from view, thereby avoiding any significant interference with transparency properties of the complete composite panel. Furthermore, although the sheeting does not significantly interfere with the transparency properties, it does contribute greatly to the strength properties and the ability of the composite panel to support its own weight. It has been found that, when the sheeting is omitted from an otherwise identical composite panel, the resulting panel will not properly support its own weight and will shatter when subjected to impacts. The embedded sheeting also helps to prevent warping of the composite.

The decorative properties in accordance with the present invention are due in large measure to the particulates 23 and their visibility when embedded within the resin. The particulates can take on any shape which is aesthetically pleasing and may be made of various materials, preferably solids, including glass, metal, wood and polymers or plastics. The particulates can be each of the same size or can vary in size when within the same composite panel. Generally speaking, these particulates should be shaped to provide decorative interest, such as being in the forms of chips or flakes which have a myriad of surfaces and exhibit different surface intersection angles in order to catch the light in a variety of planes. The particulates can be the same color within any given composite panel, or multiple colors can be used as desired. Particularly preferred particulates are chips of crushed, colored glass. In some instances, colorless or virtually transparent particulates can be used in order to impart a glistening type of appearance to the composite panel without directly adding color.

Particulate sizes can vary as desired. Often the sizing can be somewhat random, such as can be the case for crushed glass particulates. Particulate sizes can, for example, range between about 0.01 inch (0.25 mm) and about 1 inch (25.4 mm). Generally speaking, the fully embedded particulates will have a particle size, or approximate length or width, of between about 0.1 inch (2.54 mm) and about 0.75 inch (19 mm). More preferably, the fully embedded, interior particulates will have a particle size on the order of between about 0.2 inch (5 mm) and about 0.6 inch (15 mm).

In certain instances, there may be a desire to have a portion of the volume of an outermost collection of particulates protrude beyond the outside surface of the resin. This can be desirable in those situations where a wear-resistant surface is desired, such as when the composite panels are to be used as flooring. In those instances, where there is a desire to have a substantially smooth, yet abrasion-resistant and wear-resistant surface, the particulates will be relatively small and preferably generally spherical in shape. These can take the form of silica sand, stone chips, metal chips and the like. Silica sand is particularly preferred for this use because it provides a gritty surface of transparent particles which are similar to glass beads in appearance. Typical particle sizes for these types of particles are between about 0.01 inch (0.25 mm) and about 0.04 inch (1 mm).

With reference to the resin material, polymers which set to a rigid condition and which can be transparent or "water clear" when desired can be used. Examples are polyesters, epoxies, acrylic resins, polyester/acrylic resins, polyester/epoxy resins, and the like. Although they are preferably transparent or at least translucent, they may be tinted in order to impart desired color effects when so desired. Colors may be chosen to complement, augment or contrast any coloration of the particulates. The resin should also be moldable such that it will readily set within a forming or shaping mold. In addition, the resins should exhibit adequate open time so that the resin can be cast in layers such as generally discussed herein. The resin also should be adequately compatible with the particulates so as to avoid dulling of the particulates. The resins should also exhibit adequate viscosity at a convenient time during their setting process so that the particulates will be relatively evenly spread out within the resin matrix which is formed when the resin cures and sets. The thus formed matrix encapsulates the particulates, which are typically randomly positioned throughout the completed composite panel.

Concerning the sheeting material, it typically will be somewhat flexible and easily positioned within the resin during its curing phase. The sheeting should be relatively tough to the extent that it exhibits resistance to tearing or severance when subjected to lateral forces. The sheeting may be a fabric or it may be a mesh type of material. Examples include fiberglass fabric, glass fabric, glass mesh, metal mesh and polymer mesh. When a transparent and generally invisible sheeting is desired in the formed and cured composite, fiberglass fabric is especially preferred. When it is desired that the sheeting be visible, such as for decorative reasons, then a metal mesh or polymer mesh having a grid structure can be chosen. This grid structure is then visible through the resin and results in an appearance which is unique in that both the particulates and the mesh grid are visible. Once again, color choices can be varied depending upon the appearance intended for the completed composite panel.

Figure 6:
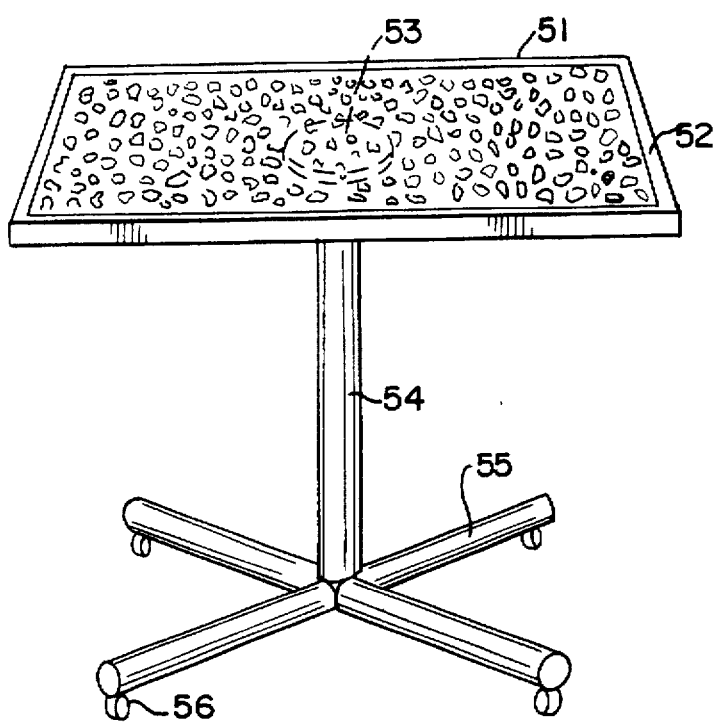
FIG. 6 is a perspective view of an example of an article, namely a table, incorporating a panel in accordance with the present invention.
Figure 7:
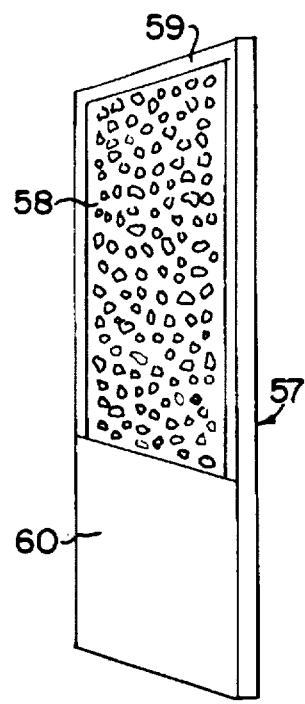
FIG. 7 is a perspective view of another illustrative embodiment, this one taking the form of a door or wall panel incorporating a composite according to the invention.
Figure 9:
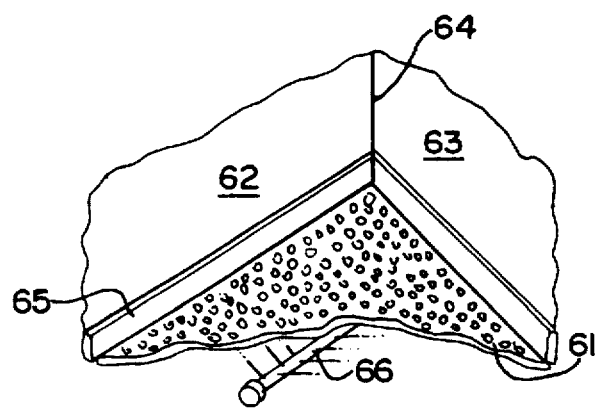
FIG. 9 is a perspective view, partially cut away, showing a flooring application.

With further reference to the drawings, FIG. 6, FIG. 7 and FIG. 9 illustrate different articles incorporating composite panels in accordance with the present invention.

FIG. 6 shows a typical table having a composite panel top 51 made in accordance with the present invention. This type of panel top could also be used for other furniture tops, such as desks. In the illustrated embodiment, the composite panel top 51 has an edge molding 52 along its perimeter. While this edge molding is preferred in order to impart a particular look to the table, the composite panel top 51 has adequate self-supporting characteristics such that the edge molding 52 can be omitted when desired. These self-supporting characteristics also permit the composite panel top 51 to be supported along less than its entire bottom surface, such as along the illustrated pedestal top 53. Securement can be by means of screws, bolts, connectors, adhesives and combinations of these fastening means. Additional stabilization can be provided by including struts (not shown) emanating from or secured to the pedestal top 53. The illustrated pedestal table includes pedestal 54 and legs 55, which are illustrated to include optional casters 56. It will be appreciated that, with this top in accordance with the present invention, light will pass through the composite panel top, which will have a somewhat transparent appearance while still exhibiting desired coloration and reflectivity as desired.

FIG. 7 illustrates a panel-type embodiment. The illustrated panel 57 can form or be a component of a door, a decorative panel, a wall, a vertical partition, a window and the like. A vertical composite panel 58, which is made in accordance with the invention as discussed herein, is included. Any desirable mounting arrangement can be utilized, such as the illustrated framing 59 and support wall 60. As with the other embodiments, in the preferred arrangement of the vertical composite panels, light can pass therethrough in order to provide a generally transparent yet secure panel. When used as a wall panel, the vertical composite panel affords an opportunity for a wall of indirect lighting by providing a suitable light source (not shown) on one side of the panel.

In FIG. 9, the composite panel forms a flooring 61. This is illustrated installed within a room, the walls 62, 63 and their intersecting corner 64 being illustrated, together with baseboard molding 65. The composite panel according to the invention allows for the inclusion of a light source 66 positioned beneath the floor. The result is a floor which itself provides indirect lighting into the room and the unusual appearance of a floor that is lit from below.

With an embodiment such as that shown in FIG. 9, the composite panel flooring 61 will be subjected to greater abuse than for the other embodiments which are illustrated. This being the case, the outside surface (such as surface 25 in FIG. 1) of the composite panel could be subjected to heavy foot traffic and other abrasive conditions. Reasonably acceptable protection from wear and dulling can be accomplished by applying a suitable surface coating such as a floor wax product onto this outside surface. When it is desirable to avoid or minimize such a waxing exercise, a layer of fine particulates 67 can be presented at the flooring surface 68 such that portions of the fine particles 67 protrude slightly above the flooring surface 68, as generally illustrated. In this arrangement, the flooring surface 68 can be the resin used in making the composite panel laminate.

Figure 8:
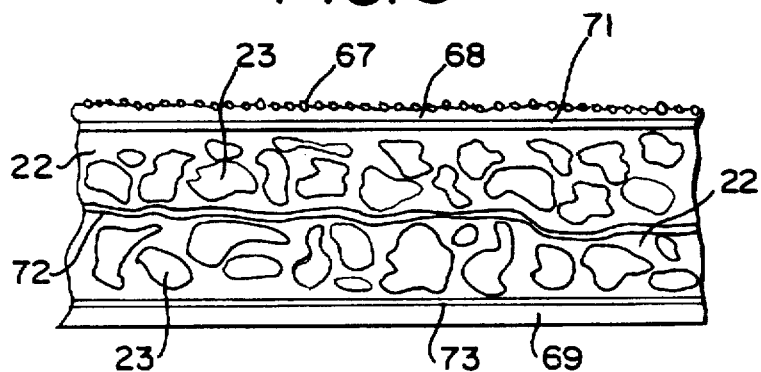
FIG. 8 is a generally sectional view illustrating an embodiment which is especially suitable for use in flooring applications.

Alternatively, the fine particulates 67 could be fully embedded within this resin, rather than partially embedded as illustrated in FIG. 8. In that instance, the fine particulates can become exposed after a wearing or breaking-in period during which a top layer of the flooring surface 68 is removed until a portion of the volume of the particulates is exposed. Also illustrated in FIG. 8 are particulates 23, a bottom resin layer 69 portion of the resin matrix 22, as well as flexible sheeting. In this illustrated embodiment, the flexible sheeting includes a top flexible sheet 71, an intermediate flexible sheet 72, and a bottom flexible sheet 73.

Composite panels according to the invention are most suitably made by a molding operation wherein different layers of the composite are prepared and molded, one on top of another. When a composite panel such as that for use in making the table illustrated in FIG. 6 is to be manufactured, a simple mold can be used. Such a mold is square in horizontal cross-section, has a planar bottom, and has a square perimeter sidewall protruding above the planar surface. The resin to be used in making the matrix is poured onto the planar resin surface at a relatively low height adequate to provide a planar surface to the finished composite. Thereafter, the particulates and the flexible sheets are added in a generally layered and/or alternating fashion.

Generally speaking, the sheeting will be laid down by itself onto a partially set resin layer. The particulates can be poured into a layer of previously poured and unset resin which has adequate viscosity to permit desired distribution of the particulates within this resin layer. Alternatively, the resin and particulates can be added together as a pre-mixed blend which is poured into the mold at the suitable time. The various resin layers, including the outermost layers and the internal layer(s) having the particulates therewithin, will bond to each other during the manufacturing process in order to provide a finished composite panel which is a cohesive unit which is strong enough to support its own weight and to function as a table top or desk top having minimal bottom support so as to take advantage of any transparency properties. During the method, a plurality of flexible sheets, whether fabric or mesh, will be laid down in a manner generally parallel to each other. Preferably, at least two of the sheets will be spaced from each other by a vertical distance when within the horizontally oriented mold.

Example 1

A composite panel laminate suitable for use as a table top or desk top was prepared. A rectangular mold having a planar bottom and vertical sidewalls along its entire perimeter was provided. A transparent resin was poured thereinto to a depth of about 1/16 inch (approximately 1.6 mm) and allowed to partially set. Next, a fiberglass fabric sheet was laid onto this initial resin layer. Thereafter, a mixture of this same resin and ground glass chips was poured over the fiberglass fabric so as to be somewhat level. Thereafter, an intermediate sheet of fiberglass fabric was laid over the particulate and resin mixture. Next, another layer of that same particulate and resin mixture was poured onto the intermediate fiberglass sheet, and a third fiberglass sheet was placed thereover. A thin overlayer of the resin was applied over the fiberglass fabric in order to totally cover it, the thickness of this resin layer being about the same as a resin layer which was first laid into the mold. The resin was then allowed to cure fully, and the resulting composite panel was removed from the mold.

The composite had transparent properties, although it had a somewhat translucent appearance, giving it an overall "satin" finish. This was transformed to a high gloss finish by polishing all six of the outside surfaces of the composite panel. This panel had a water clear resin matrix. The glass chips, some of which were colored and some of which were generally crystal clear, were distinctly visible through the resin matrix. The fiberglass fabric sheets were virtually invisible and were not noticeable without careful inspection of the composite panel furniture top.

Example 2

The procedure of Example 1 is generally repeated. However, prior to final curing of the uppermost layer of resin within the mold, a layer of silica sand having an average particle size of about 1/16 inch is spread in a uniform manner and such that a portion of a large number of the silica sand particles protrude above the top resin layer. After final curing, the composite has a smooth silica sand surface. This composite panel is suitable for use in high abrasion situations, such as flooring.

It will be understood that the embodiments of the present invention which have been described are illustrative of some of the applications of the principles of the present invention. Numerous modifications may be made by those skilled in the art without departing from the true spirit and scope of the invention.

I claim:

1. A composite panel, comprising:
    a resin matrix composed of a cured resin having transparency properties that allow for light passage therethrough;
    a plurality of particulates embedded within and visible through said resin matrix;
    a plurality of flexible sheets fully embedded within said resin matrix, said sheets being generally parallel to each other within the matrix, at least two of said sheets being spaced from each other, and at least one of said flexible sheets being located within the layer containing the particulates; and
    said particulates, sheets and resin matrix combine to provide a composite panel laminate which supports its own weight and within which a plurality of said particulates are visible through the cured resin and flexible sheets.

2. The composite panel in accordance with claim 1, wherein a layer of said resin matrix is external of said flexible sheets.

3. The composite panel in accordance with claim 1, wherein said composite panel laminate includes: ordered layers of the cured resin, at least one flexible sheet, the cured resin with a plurality of said particulates therewithin, another said flexible sheet, and a layer of the cured resin.

4. A composite panel comprising:
    a resin matrix composed of a cured resin;
    a plurality of particulates embedded within said resin matrix, said resin matrix having transparency properties such that said particulates are visible through the resin matrix;
    a plurality of flexible sheets fully embedded within said resin matrix, said sheets being generally parallel to each other within the matrix, and at least two of said sheets being spaced from each other;
    said particulates, sheets and resin matrix combine to provide a composite panel laminate which supports its own weight and within which a plurality of said particulates are visible; and
    said composite panel laminate includes, in ordered layers: a layer of the cured resin, at least one of the flexible sheets, a combination of the particulates within said resin, at least another one of the flexible sheets as an intermediate flexible sheet, a composite of said particulates within the resin, at least a further one of the flexible sheets, and a further layer of the resin.

5. The composite panel in accordance with claim 1, wherein said particulates are glass chips, said flexible sheets are fiberglass fabric, and said cured resin is a transparent polymer.

6. The composite panel in accordance with claim 1, wherein said resin is selected from the group consisting of polyesters, epoxies, acrylic resins, polyester/acrylic resins and polyester/epoxy resins.

7. The composite panel in accordance with claim 1, wherein said particulates are selected from the group consisting of flakes and chips of glass, metal, wood and polymers.

8. The composite panel in accordance with claim 1, wherein said flexible sheets are selected from the group consisting of fiberglass fabric, glass fabric, glass mesh, metal mesh and polymer mesh.

9. The composite panel in accordance with claim 1, wherein said flexible sheets are fabric sheets.

10. The composite panel in accordance with claim 1, wherein said flexible sheets are mesh sheeting.

11. An article of manufacture comprising:
    a supporting member and a composite panel supported thereby, said composite panel including:
    a resin matrix composed of a cured resin having transparency properties which allow for light passage therethrough;
    a plurality of particulates embedded within and visible through said resin matrix;
    a plurality of flexible sheets fully embedded within said resin matrix, said sheets being generally parallel to each other within the matrix, at least two of said sheets being spaced from each other, and at least one of said flexible sheets being located within the layer containing the particulates; and
    said particulates, sheets and resin matrix combine to provide a composite panel laminate which supports its own weight and within which a plurality of said particulates are visible through the cured resin and flexible sheets.

12. The article of manufacture in accordance with claim 11, wherein said article of manufacture is a piece of furniture, wherein said supporting member comprises a floor engaging member and a generally horizontal member which is maintained above the floor by said floor-engaging member.

13. The article of manufacture in accordance with claim 11, wherein said supporting member orients said composite panel in a horizontal orientation which is generally parallel to the floor.

14. The article of manufacture in accordance with claim 11, wherein said supporting member orients said composite panel in a vertical orientation which is generally perpendicular to the floor.

15. The article of manufacture in accordance with claim 11, wherein said composite panel laminate includes: ordered layers of the cured resin, at least one flexible sheet, the cured resin with a plurality of said particulates therewithin, another said flexible sheet, and a layer of the cured resin.

16. An article of manufacture comprising: a supporting member and a composite panel supported thereby, said composite panel including:
    a resin matrix composed of a cured resin;
    a plurality of particulates embedded within said resin matrix, said resin matrix having transparency properties such that said particulates are visible through the resin matrix;
    a plurality of flexible sheets fully embedded within said resin matrix, said sheets being generally parallel to each other within the matrix, and at least two of said sheets being spaced from each other;
    said particulates, sheets and resin matrix combine to provide a composite panel laminate which supports its own weight and within which a plurality of said particulates are visible; and said composite panel laminate includes, in ordered layers: a layer of the cured resin, at least one of the flexible sheets, a combination of the particulates within said resin, at least another one of the flexible sheets as an intermediate flexible sheet, a composite of said particulates within the resin, at least a further one of the flexible sheets, and a further layer of the resin.

17. The article of manufacture in accordance with claim 11, wherein said particulates are glass chips, said flexible sheets are fiberglass fabric, and said cured resin is a transparent polymer.

18. The article of manufacture in accordance with claim 11, wherein said resin is selected from the group consisting of polyesters, epoxies, acrylic resins, polyester/acrylic resins and polyester/epoxy resins.

19. The article of manufacture in accordance with claim 11, wherein said particulates are selected from the group consisting of flakes and chips of glass, metal, wood and polymers.

20. The article of manufacture in accordance with claim 11, wherein said flexible sheets are selected from the group consisting of fiberglass fabric, glass fabric, glass mesh, metal mesh and polymer mesh.

* * * * *